United States Patent
Perlmutter

(10) Patent No.: US 8,831,183 B2
(45) Date of Patent: Sep. 9, 2014

(54) METHOD FOR SELECTING INTERACTIVE VOICE RESPONSE MODES USING HUMAN VOICE DETECTION ANALYSIS

(75) Inventor: S. Michael Perlmutter, San Francisco, CA (US)

(73) Assignee: Genesys Telecommunications Laboratories, Inc, Daly City, CA (US)

( * ) Notice: Subject to any disclaimer, the term of this patent is extended or adjusted under 35 U.S.C. 154(b) by 1427 days.

(21) Appl. No.: 11/615,434

(22) Filed: Dec. 22, 2006

(65) Prior Publication Data

US 2008/0152094 A1  Jun. 26, 2008

(51) Int. Cl.
*H04M 1/64*     (2006.01)
*G10L 25/78*    (2013.01)
*G10L 21/0208*  (2013.01)
*G10L 15/30*    (2013.01)
*H04M 3/493*    (2006.01)

(52) U.S. Cl.
CPC ............ *H04M 3/4936* (2013.01); *G10L 25/78* (2013.01); *G10L 21/0208* (2013.01); *G10L 15/30* (2013.01)
USPC .......................... 379/88.01; 704/231; 704/275

(58) Field of Classification Search
USPC ............ 379/88.01, 88.02; 704/231, 275, 246, 704/251
See application file for complete search history.

(56) References Cited

U.S. PATENT DOCUMENTS

| | | | |
|---|---|---|---|
| 5,483,579 A | 1/1996 | Stogel | |
| 6,539,078 B1 | 3/2003 | Hunt et al. | |
| 6,580,927 B1 | 6/2003 | Nilsson | |
| 6,584,180 B2 * | 6/2003 | Nemoto | 379/88.01 |
| 6,839,670 B1 | 1/2005 | Stammler et al. | |
| 7,502,742 B2 * | 3/2009 | Knott et al. | 704/275 |
| 2001/0011217 A1 * | 8/2001 | Ammicht et al. | 704/231 |
| 2002/0087306 A1 | 7/2002 | Lee et al. | |
| 2005/0114118 A1 * | 5/2005 | Peck | 704/208 |
| 2006/0009974 A1 | 1/2006 | Junqua et al. | |
| 2006/0200348 A1 * | 9/2006 | Knott et al. | 704/246 |
| 2006/0206329 A1 | 9/2006 | Attwater et al. | |
| 2006/0215821 A1 | 9/2006 | Rokusek et al. | |
| 2007/0133575 A1 * | 6/2007 | Cai et al. | 370/401 |
| 2007/0206576 A1 * | 9/2007 | Radulovic | 370/352 |
| 2009/0245539 A1 * | 10/2009 | Vaudrey et al. | 381/109 |

FOREIGN PATENT DOCUMENTS

WO   WO 2005/069278 A1   7/2005

OTHER PUBLICATIONS

Lin Chin-Teng et al., GA-Based Noisy Speech Recognition Using Two-Dimensional Cepstrum, IEEE Transactions on Speech and Audio Processing, IEEE Service Center, New York, NY, US, vol. 8, No. 6, Nov. 1, 2000, XP011054055, ISSN: 1063-6676.

(Continued)

*Primary Examiner* — Simon King

(74) *Attorney, Agent, or Firm* — Christie, Parker & Hale, LLP

(57) ABSTRACT

In an interactive voice response system, a method is provided for selective enhancement of voice recognition capability during an interaction. The method includes the acts (a) taking a call and prompting for a voice response from the caller, (b) failing to recognize the response, (c) executing a routine to detect and isolate the captured word or phrase in the response, and (d) attempting to recognize the response a second time.

18 Claims, 2 Drawing Sheets

(56) References Cited

OTHER PUBLICATIONS

Yuo Kuo-Hwei et al., Robust Features Derived from Temporal Trajectory Filtering for Speech Recognition under the Corruption of Additive and Convolutional Noises, Acoustics, Speech and Signal Processing, 1998. Proceedings of the 1998 IEEE International Conference on Seattle, WA, USA May 12-15, 1998 New York, NY, USA, IEEE, US, vol. 1, May 12, 1998, pp. 577-580, XP010279038, DOI: 10.1109/ICASSP.1998.674496, ISBN: 978-0-7803-4428-0.

International Search Report for International Application No. PCT/US2007/088559, dated Apr. 22, 2008, 2 pages.
Extended European Search Report for Application No. EP 07 86 5958, dated Sep. 26, 2011, 9 pages.
Office action and English translation for Chinese Application No. 200780047453.8, dated Jan. 26, 2011, 13 pages.
Office action and English translation for Chinese Application No. 200780047453.8, dated Aug. 5, 2011, 15 pages.
Office action and English translation for Chinese Application No. 200780047453.8, dated May 3, 2012, 14 pages.

* cited by examiner

METHOD FOR SELECTING INTERACTIVE VOICE RESPONSE MODES USING HUMAN VOICE DETECTION ANALYSIS

CROSS-REFERENCE TO RELATED APPLICATIONS

NA

BACKGROUND OF THE INVENTION

1. Field of the Invention

The present invention is in the field of interactive voice recognition (VR) systems and pertains particularly to methods for using human voice detection results to select and implement IVR mode during interaction with a caller.

2. Discussion of the State of the Art

Interactive voice response (IVR) units are used primarily to interface with callers accessing a point of service or point of routing in a communications network environment, typically a telephone environment. Modern IVR systems enable a caller to make specific menu selections by pushing a button on duel tone multi-frequency (DTMF) enabled telephones. Most modern telephones use the DTMF system. More recently, IVR systems have been improved to include voice recognition capability. Voice recognition at an IVR unit often is made available in conjunction with standard DTMF pushbutton selection options.

One reason that voice recognition is used in an IVR system is to enable those without pushbutton capability on their communications devices to interact with the system. This is suitable in a low noise environment where the user's voice is very clear. State-of-art systems are not always accurate in voice interpretation even in lower noise environments. In moderate and high noise environments like transit stations, airports, clubs, automobiles, or the like, the IVR often fails to recognize the human voice because of interference of the background noises and therefore is unable to recognize the speech pattern under those adverse conditions. User's that do not have buttons on their devices cannot successfully prosecute the transaction under those circumstances. Duel mode (voice and DTMF) IVR routines attempt to recognize the human voice by default, but will accept a tone for menu selection. The menu typically prompts a user to say a particular word or phrase, or to enter an equivalent value by depressing a key on the communications device. A user operating in a moderate to high noise environment often attempts to enunciate the voice key first for every prompt response before finally depressing the appropriate value key not understanding that the system will not recognize any of the user's voice enunciations because of the background noise level and/or type.

Human voice detection solutions do exist for the purpose of detecting human voice in an audio signal which may include background noise. One method for detecting human voice in an audio signal is described in U.S. Pat. No. 6,321,194 issued Nov. 20, 2001 to Brooktrout Technology, Inc. titled Voice Detection in Audio Signals. The method uses fuzzy logic to determine a likelihood of human voice in a random audio signal sample by observing power thresholds and frequencies in the sample and generating result values that are compared against known human voice frequencies. The algorithm determines a statistical likelihood of whether the human voice is detected in the sample. Likewise, ways of isolating human voice from background noise in an audio sample have been researched and developed that employ other digital and analog methods to detect and to differentiate human voice from random noise.

What is clearly needed in the art is a method for selecting and implementing a default IVR mode based on HVD analysis of the voice responses received during interaction. A system such as this would streamline IVR interaction for callers enabling faster call handling.

SUMMARY OF THE INVENTION

In an interactive voice response system, a method is provided for enhancing voice recognition capability during an interaction. The method includes (a) taking a call and prompting for a voice response from the caller, (b) attempting to recognize the response, (c) upon failing to recognize the response in step (b), executing a routine to detect and isolate the captured word or phrase in the response, and (d) attempting to recognize the response a second time. In one aspect, in step (a), the call is from one of a cell phone, a PSTN-connected telephone, or a voice enabled headset. In step (b), failure is due to high non-human noise levels in the response.

In a preferred aspect, in step (c), the routine is a human voice detection routine aided by human voice detection software. Also in this aspect, the noise that is not part of the word or phrase of the response is subtracted out of the captured data. In one aspect in step (d), the second attempt uses the same voice recognition routine as the first attempt.

According to another aspect of the present invention, in an interactive voice response system, a method is provided for automatically switching mode of the system during an interaction based on performance of the system. The method includes the acts (a) taking a call and prompting for a voice response from the caller, (b) attempting to recognize the response, (c) upon failing to recognize the response in step (b), executing a routine to detect and isolate the captured word or phrase in the response, (d) failing to recognize the response a second time, and (e) overriding voice detection mode and setting pushbutton mode as default mode for the rest of the current transaction.

In one aspect of the method, in step (a), the call is from one of a cell phone, a PSTN-connected telephone, or a voice enabled headset. In step (b), failure is due to high non-human noise levels in the response. In a preferred aspect, in step (c), the routine is a human voice detection routine aided by human voice detection software. In one aspect, in step (d), there is not enough of the human voice detected to facilitate a match in the second recognition attempt. In one aspect, in step (e), the caller is prompted to notify of the override condition.

In one aspect of the method, whether or not there is a step (e) for mode override, step (a) is replaced by a step (a) for placing a call and upon the call being answered, prompting the called party for a response.

According to another aspect of the present invention, a duel mode IVR system is provided. The system includes a telephone interface switch, a voice recognition software instance and library, and a human voice detection software instance. The human voice detection software is called and executed during an IVR interaction with a caller only if the voice recognition software routine fails to recognize a response uttered by the caller.

In one embodiment, the telephone switch is a central office switch connected to a private branch exchange (PBX). In one embodiment, the voice recognition software is Voice over Extensible Markup Language (VOXML) enabled.

In yet another aspect of the invention, a machine readable medium is provided, the medium having thereon a set of instructions that cause a machine to perform a method including (a) taking a call and prompting for a voice response from the caller, (b) attempting to recognize the response, (c) upon failing to recognize the response in step (b), executing a routine to detect and isolate the captured word or phrase in the response.

In one aspect in step (a), the call is taken at an interactive voice response system. In one aspect, in step (c), the routine includes a sub step for setting the default mode of the interactive voice response system for the rest of the interaction with the caller according to the result of a second attempt to recognize the response.

BRIEF DESCRIPTION OF THE DRAWING FIGURES

DETAILED DESCRIPTION

Figure 1:
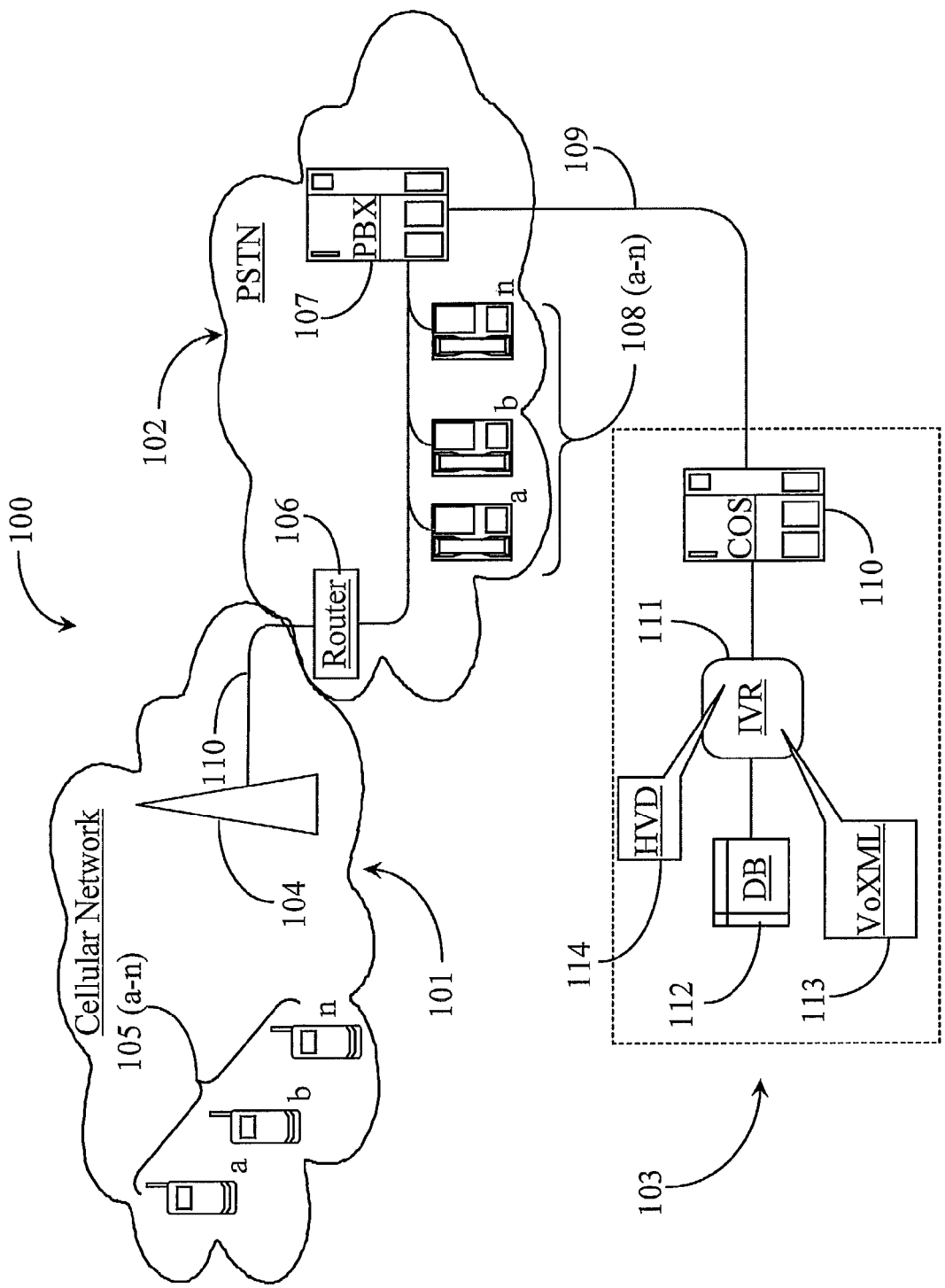
FIG. 1 is an architectural overview of an IVR system enhanced with human voice detection according to an embodiment of the present invention.

FIG. 1 is an architectural overview of a voice telephony environment 100 including an IVR system enhanced with human voice detection according to an embodiment of the present invention. Voice telephony environment 100 includes a public switched telephone network (PSTN) 102, a cellular network 101, and a communication center service point 103.

PSTN network 102 may instead be a private telephone network instead of a public network. PSTN network 102 includes a private branch exchange (PBX) telephony switch 107. Switch 107 may be an automated call distributor (ACD) type switch, or some other telephony network switch capable of processing and routing telephone calls. PBX 107 is connected to a central office switch (COS) 110 located within communication center service point 103 by a telephone trunk 109. Service point 103 also includes an interactive voice response (IVR) unit 111, connected to COS 110 via a computer telephony integration (CTI) link.

Cellular network 101 may be any type of digital or analog network supporting wireless telephony without departing from the spirit and scope of the present invention. Network 101 includes a cell tower 104 connected by a telephone trunk to an edge router 106 just inside the PSTN 106. In this example, callers 105 (a-n) communicate through tower 104, which routes the call into the PSTN via trunk 110 through router 106 on to PBX 107. Callers 108 (a-n) are wired to PBX 107 via telephone wiring. QOS may at times be quite different for the different networks 101 and 102 in terms of voice quality and the amount of noise interference. Generally speaking, a wired telephone on a dedicated connection has better voice quality more of the time than, for example, a cellular telephone over a shared connection. Moreover, other factors may contribute to noise that is captured from the caller environment and carried along with the voice during a call.

IVR 111 intercepts calls from callers 108 (a-n) and from callers 105 (a-n) and attempts to provide service to those callers based on planned voice interaction (voice application) sessions with those callers. The voice interactions may be any type of voice interaction from those that provide internal routing to a live agent, and/or those that actually complete the call using automated transaction processing techniques.

In this example, IVR 111 has a voice over XML voice recognition program 113 provided that utilizes a database 112 that contains a programmable library of word and phrases to aid in recognizing voice commands, words and/or phrases spoken by the caller. The spoken voice is recognized by searching for the VoXML equivalent stored in the database. It is important to note herein that voice does not have to be recognized perfectly for a successful match of a caller's spoken word or phrase in database 112. If a phrase is mostly recognized, then the software may still produce the correct system response to the voice phrase uttered by the caller. There are several known ways including statistical pattern matching that can be used to help the voice recognition accuracy within the digital processing realm of IVR 111. Another technique is to pool variant response words or variances of response phrases and equate them to a same value.

In this example, IVR 111 has, in addition to standard voice recognition capability, an instance of human voice detection (HVD) software provided thereto and executable thereon. HVD 114 is provided to enhance the voice recognition capability of IVR 111 by detecting in the audio captured from the caller the human voice portion of the total audio data. Provided that the human voice data can be reliably detected then the data that does not appear to be human voice can be subtracted from an equation before standard voice recognition is employed. The method can be applied after voice recognition has failed to recognize an uttered word or phrase on a first attempt. Attempting to recognize the caller word or phrase using standard non-enhanced voice recognition software may be a default routine because under low noise circumstances there may be no need for enhancement. However under moderate to high noise scenarios, for example, a cell phone caller in a construction zone, HVD may be helpful in isolating the human portion of the signal for presentation of only the human signal to the voice recognition software.

In actual practice, if caller 108 a, for example, is in interaction with IVR 111 at switch 110, standard voice recognition software may work fine for most of the prompt/response rounds. However, if during one round, the caller's word or phrase is not immediately recognized by the software, then instead of forcing the caller to depress a button, HVD can be used to refine the signal and a second attempt to recognize the word or phrase may be initiated. The time it takes to call the HVD routine and execute it to completion is negligible in terms of call flow. COS 110 has a processor of suitable power and speed to run an analysis very quickly. In another instance, a cellular caller 105n may require HVD intervention for each prompt/response round at IVR 111 because of background noise prevalence. However, the noise causing the problem might be temporary. Therefore, attempting to recognize the caller's word or phrase using the standard VRT may allow discontinuance of the HVD cycle for one or more prompt/response rounds.

It will be apparent to one with skill in the art that the method of the present invention can be used to improve the interaction accuracy. Likewise, there would be less dependence on the backup DTMF pushbutton method for the caller to insert a value. Therefore, those callers that do not have pushbutton capability on their communications devices would receive better service. If the system is implemented according to the method described, the voice application prompts would not necessarily be required to include a push button value along with the appropriate voice response word or phrase. If the enhanced system failed to recognize the caller's word or phrase one or a specified number of times, a system prompt might be rotated in that informs the caller that voice recognition has been turned off because of the noise level or type the system is experiencing. In this case, the subsequent prompts could be based on DTMF pushbutton only and VRT capability could be suspended for the rest of that session.

One with skill in the art will recognize that the method described can be implemented in a telephony environment or in a voice over internet protocol environment where an IVR equivalent is implemented. The IVR system itself may be caused to switch between modes in midstream based on the application of the method integrated with controlling IVR software. The HVD routine may be plugged into normal IVR programming by inserting a removable media containing the sequence start all of the tasks and the sequence end. The routine can be inserted into any of the voice application running on the system.

Figure 2:
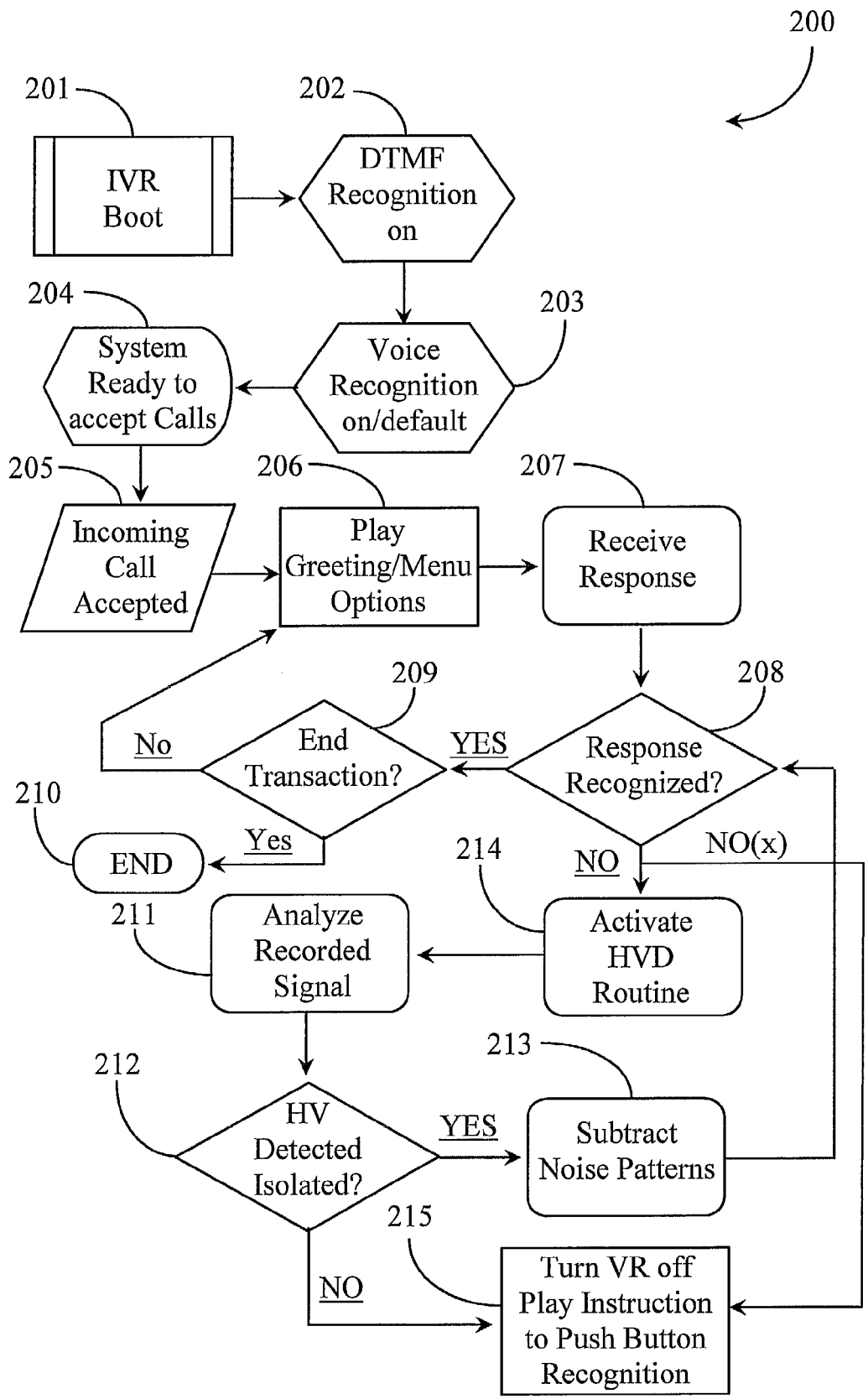
FIG. 2 is a process flow chart illustrating acts for selecting and implementing IVR mode during interaction according to an embodiment of the present invention.

FIG. 2 is a process flow chart illustrating acts 200 for selecting and implementing IVR mode during interaction according to an embodiment of the present invention. The following acts reflect just one of a number of possible processes that could be programmed into IVR control software and caused to run automatically as calls are processed by the IVR system.

In step 201, the IVR boots or otherwise is brought online. In step 202, DTMF pushbutton recognition is activated as a backup measure. In step 203, voice recognition is activated and set as the default mode. It is noted herein that pushbutton recognition can be active transparently to callers where IVR prompts do not inform callers of pushbutton values equivalent to voice words or phrases required to navigate the system.

At step 204, the IVR system is ready to accept calls from callers. At step 205, an incoming call is accepted. At step 206, the IVR system plays the greeting and menu options to the caller and waits for the caller voice response. At step 207, the IVR system receives a voice response from the caller according to the menu options.

At step 208, the IVR system attempts to recognize the caller's response using the standard VRT software. If at step 208, the caller's response is effectively recognized, then the IVR system determines if the transaction is complete in step 209. If the transaction is complete at step 209, then at step 210 the process ends and the system takes the next call waiting. If at step 209, the transaction is not yet complete, then the process loops back to step 206 where the IVR system plays the next prompt to the caller and waits for the caller's next response. The process then moves to step 208 again where the IVR determines if the recognition was successful using the standard VRT technology. If so, then the loop continues without calling any additional routines until the caller's response is not recognized using standard recognition software at step 208.

At step 208, any time during the interaction with the caller, if the response is not recognized using standard VRT, then at step 214, the HVD software routine analogous to SW 111 of FIG. 1 is activated. The process then moves to step 211 where the HVD routine analyses the recorded response signal, to detect the human voice in the signal. At step 212, the system determines if the human voice is detected and can be isolated from other noise in the signal. If at step 212, the human voice is identified and isolated from the rest of the signal, then at step 213, the HVD routine subtracts the noise patterns from the signal. It is noted herein that the HVD process may be performed on a suitable digital signal processor that has all of the required circuitry and power for performing the required calculations to detect the human voice pattern and to isolate it from the noise patterns.

The process then moves back to step 208 where the IVR system again attempts to recognize the caller's word or phrase from a cleaner signal. If at step 208, the system still cannot recognize the caller's word or phrase after enhancement, then the process may resolve to step 215 where the system turns off VRT and may prompt the caller with a notice or instruction to use DTMF pushbutton interaction for the rest of the call. In this act, the IVR may play a voice message that tells the caller that due to high interference or background noise, please depress the keys on your communications device when prompted to do so to navigate the rest of this transaction. It is noted herein that the system may revert to abandoning VRT for any caller just after one failure of the system to recognize the caller's word or phrase after HVD analysis.

If at step 208 the system does recognize the caller's utterance after HVD intervention, and in step 209, it is not the end of the transaction, then the process loops back to step 206 and continues with step 207 and 208 using standard VRT. In this example, HVD is not used unless there is a failure with the standard approach. In a case where the caller does not have touch tone buttons or is not able to interact with them because the caller is otherwise engaged in driving or some other focused activity, then the system may simply ask the caller to try again later. At step 212, if HV is not detected by the HVD system, then by default step 215 may occur, switching IVR mode to pushbutton for the rest of the transaction.

It will be apparent to one with skill in the art that some variation may be afforded to this process of acts 200 without departing from the spirit and scope of the present invention. In one embodiment, caller's who may also subscribe to a service using the method of the invention may set their own preference for DTMF pushbutton or VRT interaction by default. Such allowances could change the process acts in terms of number of acts and order of acts. Other acts may be inserted, for example, to convert language. In this way, a Spanish speaker may interact with the system and have system output delivered in Spanish. It will also be apparent to the skilled artisan that the method of the present invention may also be practiced during an IVR assisted outbound calling campaign. There are many possibilities.

The method of the present invention may be practiced within the environment of an IVR system or in conjunction with any other computerized voice enabled interaction point. It will be understood by the skilled artisan that the invention may be practiced using some of, a combination of, or all of the components and acts described herein. In light of the embodiments described, the invention should be afforded the broadest possible interpretation under examination. The spirit and scope of the present invention should be limited only by the following claims.

What is claimed is:

1. A dual-mode interactive voice response (IVR) system, comprising:
   a processor; and
   a memory, wherein the memory stores instructions that, when executed by the processor, cause the processor to:
      provide an audio message to a caller prompting a selection from among a plurality of selectable options;
      receive an audio response signal from the caller;
      process the audio response signal for recognizing the selection from among the plurality of selectable options;
      separate a human voice pattern from a background noise in the audio response signal in response to not recognizing the selection from among the plurality of selectable options; and
      process the human voice pattern for recognizing the selection from among the plurality of selectable options, wherein, after processing the human voice pattern, the instructions further cause the processor to provide an instruction to the caller to provide another audio response signal in response to not recognizing the selection from among the plurality of selectable options.

2. The dual-mode IVR system of claim 1, wherein the instructions further cause the processor to subtract the background noise from the audio response signal.

3. The dual-mode IVR system of claim 1, wherein the instructions further cause the processor to execute the selection from among the plurality of selectable options.

4. The dual-mode IVR system of claim 1, wherein, after processing the human voice pattern, the instructions further cause the processor to initiate a touch tone mode in response to not recognizing the selection from among the plurality of selectable options.

5. The dual-mode IVR system of claim 1, wherein the instructions further cause the processor to receive an audio communication from the caller prior to providing the audio message.

6. The dual-mode IVR system of claim 1, wherein the instructions further cause the processor to initiate a communication to the caller as an outbound call.

7. The dual-mode IVR system of claim 1, wherein the instructions further cause the processor to identify a language used in the audio response signal or the human voice pattern and to provide subsequent output to the caller in the language.

8. The dual-mode IVR system of claim 1, wherein the instructions further cause the processor to provide a notification to the caller indicating a high level of background noise.

9. The dual-mode IVR system of claim 1, wherein the instructions further cause the processor to provide subsequent instructions to the caller to select from among the plurality of selectable options using touch tone buttons.

10. A method for enhancing voice recognition in an interactive voice response system, the method comprising:

providing, by a processor, an audio message to a caller prompting a selection from among a plurality of selectable options;

receiving, by the processor, an audio response signal from the caller;

processing, by the processor, the audio response signal for recognizing the selection from among the plurality of selectable options;

separating, by the processor, a human voice pattern from a background noise in the audio response signal in response to not recognizing the selection from among the plurality of selectable options;

processing, by the processor, the human voice pattern for recognizing the selection from among the plurality of selectable options; and after processing the human voice pattern, providing, by the processor, an instruction to the caller to provide another audio response signal in response to not recognizing the selection from among the plurality of selectable options.

11. The method of claim 10, further comprising subtracting, by the processor, the background noise from the audio response signal.

12. The method of claim 10, further comprising executing, by the processor, the selection from among the plurality of selectable options.

13. The method of claim 10, further comprising after processing the human voice pattern, initiating, by the processor, a touch tone mode in response to not recognizing the selection from among the plurality of selectable options.

14. The method of claim 10, further comprising receiving, by the processor, an audio communication from the caller prior to providing the audio message.

15. The method of claim 10, further comprising initiating, by the processor, a communication to the caller as an outbound call.

16. The method of claim 10, further comprising identifying, by the processor, a language used in the audio response signal or the human voice pattern and to provide subsequent output to the caller in the language.

17. The method of claim 10, further comprising providing, by the processor, a notification to the caller indicating a high level of background noise.

18. The method of claim 10, further comprising providing, by the processor, subsequent instructions to the caller to select from among the plurality of selectable options using touch tone buttons.

* * * * *